United States Patent [19]
Carbonell et al.

[11] 3,987,808
[45] Oct. 26, 1976

[54] METERING SYSTEM

[75] Inventors: Jose Carbonell, Bottmingen; Rolf Hasler, Oberwil, both of Switzerland; Roland Walliser, Rixheim, France

[73] Assignee: Sandoz Ltd., Basel, Switzerland

[22] Filed: Jan. 7, 1975

[21] Appl. No.: 539,228

[30] Foreign Application Priority Data
Jan. 11, 1974  United Kingdom............... 1307/74

[52] U.S. Cl............................ 137/3; 137/93
[51] Int. Cl.²........................... G05D 11/08
[58] Field of Search............ 222/52, 129; 137/3, 137/4, 5, 6, 7, 88, 91, 92, 93, 624.11

[56] References Cited
UNITED STATES PATENTS

| | | |
|---|---|---|
| 2,927,501 | 3/1960 | Busignies et al. .................. 137/3 |
| 3,494,328 | 2/1970 | Maloney ........................ 137/93 X |
| 3,602,096 | 8/1971 | Toth .......................... 137/624.11 X |

*Primary Examiner*—Robert G. Nilson
*Attorney, Agent, or Firm*—Gerald D. Sharkin; Richard E. Vila; Thomas C. Doyle

[57] ABSTRACT

The invention concerns a novel automatic metering system for producing a liquor containing a predetermined concentration of at least one component thereof, which comprises a mixing tank in which the liquor components are mixed, a metering device adapted to meter out at least one of the components into the mixing tank, an analyzer adapted to measure the concentration of the component(s) required at a predetermined concentration and a data processing unit, with an input from the analyzer and an output to the metering device, being programmed to effect an operational cycle which comprises computing the deviation of the measured concentration from the predetermined concentration of the component(s), correlating the deviation with the amount of at least one of the components necessary to be metered out, substantially to reduce said deviation by a reduction factor of less than 100 percent, and automatically operating the metering device to meter out the correlated amount, and to repeat said operational cycle until the predetermined concentration has been substantially reached, and a method of operating the system.

25 Claims, 1 Drawing Figure

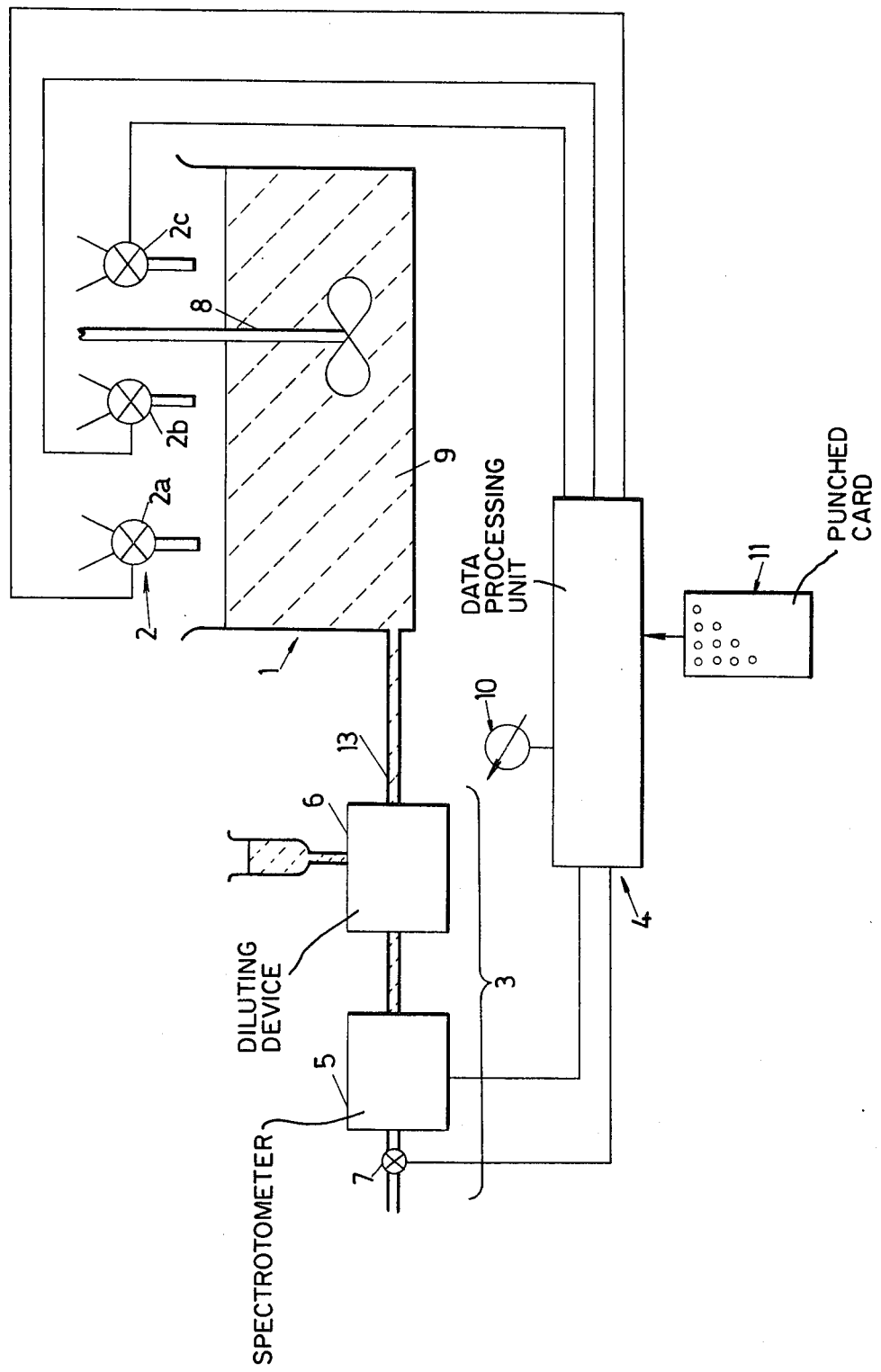

METERING SYSTEM

The present invention relates to metering systems and specifically to automatic metering systems for producing a liquor containing a predetermined concentration of at least one of the components thereof.

In the production of liquors, particularly in the dyeing industry, considerable difficulty is often experienced in accurately making up a liquor in accordance with a predetermined recipe. As will be appreciated, the accurate reproduction of a given recipe is of considerable importance, for example to enable reproducible dyeings to be obtained in the case of dye liquors. Moreover, the difficulties cannot be easily overcome by directly measuring out and mixing the components of the liquor in accordance with a predetermined recipe since impurities and other factors introduce unacceptable errors.

Accordingly, the present invention provides an automatic metering system for producing a liquor containing a predetermined concentration of at least one component thereof, which comprises a mixing tank in which the liquor components are mixed, a metering device adapted to meter out at least one of the components into the mixing tank, an analyser adapted to measure the concentration of the component(s) required at a predetermined concentration and a data processing unit, with an input from the analyser and an output to the metering device, being programmed to effect an operational cycle which comprises computing the deviation of the measured concentration from the predetermined concentration of the component(s), correlating the deviation with the amount of at least one of the components necessary to be metered out, substantially to reduce said deviation by a reduction factor of less than 100 percent, and automatically operating the metering device to meter out the correlated amount, and to repeat said operational cycle until the predetermined concentration has been substantially reached.

The present invention also provides a method of automatically producing a liquor containing a predetermined concentration of at least one component thereof, which comprises effecting the operational cycle of measuring the concentration of the component(s) required at a predetermined concentration in a premixed liquor, automatically determining the deviation of the measured concentration from the predetermined concentration, correlating the deviation with the amount of at least one of the components to be added to the liquor, substantially to reduce said deviation by a reduction factor of less than 100 percent, and automatically metering out the correlated amount into the liquor, and repeating said operational cycle until the predetermined concentration has been substantially reached.

Whilst the invention can be employed in the replenishment of at least one component of an exhausted liquor, e.g. an exhausted dye liquor, preferably it is employd in the preparation of fresh liquors. In the latter case, the metering heads automatically meter out a proportion of the predetermined amount of the or each component into the mixing chamber, e.g. under the control of the data processing unit. Conveniently the proportion metered out corresponds to the reduction factor employed in the operational cycle of the data processing unit.

In a preferred form of the invention, the correlated amount of the component(s) substantially reduces the concentration deviation, for example by a reduction factor of between 40 and 95 percent, preferably between 50 and 95 percent, e.g. between 70 and 95 percent, and more preferably between 80 and 95 percent, especially 80 to 90 percent, depending on the purity of the added components. The number of repititions of the operational cycle will naturally depend on the reduction factor involved. However, in general, by repeating the operational cycle, e.g. from 1 to 10 times, the measured concentration of the component(s) may be made to approach the predetermined concentration to a high degree of accuracy. Thus, in the case where the added component(s) varies in purity from batch-to-batch by a maximum amount of, e.g. 10 percent, then a reduction factor of the deviation of the measured from the predetermined concentration of 90 percent or below, e.g. 80 to 90 percent, would be preferably employed, to avoid the possible effect of variation in purity of the added component on the concentration of the liquor produced and the operational cycle would preferably be repeated 2 to 6 times, more preferably 2 to 4 times, especially 2 or 3 times. Thus in a preferred form of the metering system, the data processing unit is programmed to correlate the computed deviation with the amount of at least one of the components necessary to be metered out to reduce said deviation by a factor of 80 to 90 percent and in addition to repeat the operational cycle 2 or 3 times.

The analyser may comprise any of the standard devices for determining the concentration of a compound in solution or dispersion. For example, devices operating on the basis of dielectric constant, electrical conductivity or light absorbency may be employed. In the case of dye solutions or dispersions, preferably the analyser is spectrophotometric analyser including a spectrophotometer to which samples of liquor from the mixing tank may be fed. In addition, depending on the construction of the spectrophotometer and the predetermined concentration of the component(s) in the liquor, the spectrophotometric analyser may also include a device to enable the spectrophotometer to operate over an optimum absorption range. Such a device may take the form of a diluting apparatus to dilute the samples of liquor drawn from the mixing tank by an appropriate amount. Preferably, the degree of dilution is variable to enable a range of liquors with different absorbency characteristics to be handled. The degree of dilution may, for example, be determined by the data processing unit, the data processing unit being pre-programmed with a scale of dilution factors correlated against a series of different liquors or liquor components so that after the data processing unit is programmed with the liquor to be produced, the degree of dilution of samples fed to the spectrophotometer is determined automatically.

The analyser may operate continuously, a small quantity of liquor being continuously drawn from the mixing tank, or preferably intermittently and under the control of the data processing unit, small samples being intermittently tapped off from the mixing tank at the beginning of each operational cycle.

The mixing tank preferably includes means for thoroughly mixing the components of the liquor, for example a mechanical stirrer and/or a gas nozzle for admitting blasts of gas into the liquor to cause turbulence therein.

The programme determining the main function of the data processing unit, i.e. enabling the computation of the concentration deviation and the correlation between said deviation and the amount of further components necessary to be added, to reduce to the required degree said deviation, and automatically repeating the operational cycle of the metering system at fixed intervals for a pre-set number of cycles, may be determined and produced in known manner. Furthermore, the main function of the data processing unit may be augmented by subsidiary functions. Thus an important subsidiary function that may be performed, in the case when the metering system includes a spectrophotometric analyser and is employed in the production of a dye liquor containing a plurality of dye components, is the correction and, if necessary, conversion of the measured data from the spectrophotometer into actual concentration data of each dye. In this case, the spectrophotometer measures the extinction co-efficient of each dye at the absorption maximum thereof, and the correction and conversion function of the data processing unit serves to correct the extinction co-efficient data at the absorption maximum of a particular dye for the absorption due to other dyes in the liquor at the absorption maximum of the particular dye under observation, and, if necessary, to convert the corrected extinction co-efficient data into data, compatible with the predetermined concentration data thereby to enable computation of the concentration deviation in accordance with the main function. In order to establish a programme for the abovementioned correction function of the data processing unit, a series of trials are run. Each trial employs a single dye dissolved or dispersed in the dye solvent or dispersion medium and comprises recording the change in extinction co-efficient with wavelength at a series of different concentrations. The trials are repeated for each dye component of the dye liquor. The resulting information, together with the absorption maximum of each dye, is recorded by the data processing unit and the data processing unit is programmed to effect a matrix calculation over the absorption maximum of each dye, i.e. to integrate, over the absorption maximum of each dye, the extinction coefficient of the dye together with the absorption contributions of the other dye, over a series of concentrations of each of the dyes. In this manner, the data processing unit is programmed to index the measured extinction co-efficient of each of the dyes at the absorption maximum thereof to the actual extinction co-efficient, i.e. in the absence of absorption contributions of the other dyes, and to correlate the actual extinction co-efficient with the concentration thereof.

The data processing unit programme, in the form of a programmed record such as a punched card, governing the above described functions of the unit also forms part of the present invention.

As will be appreciated, the apparatus and method of the invention are well suited to the production of dye liquors containing a plurality of dye components particularly when the metering device is adapted to meter out each of the dye components.

One embodiment of the invention will now be described by way of example with reference to the accompanying drawing which shows, schematically, an automatic metering system of the invention.

The automatic metering system shown in the drawing comprises a mixing tank 1, a metering device 2, a spectrophotometric analyser 3 and a data processing unit 4.

The mixing tank 1 wherein the components of a dye liquor may be mixed, is provided with a stirrer 8. A small outlet pipe 13 is disposed at the base of the tank to enable small quantities of dye liquor to be tapped off under the control of a tap 7.

The spectrophotometric analyser comprises a spectrophotometer 5 and a diluting device 6, the outlet pipe 13 from the mixing tank 1 being connected to the diluting apparatus 6 and from here to the spectrophotometer 5.

The metering device 2 comprises three metering heads 2a, 2b and 2c and allows the metering of up to three different dye components of the dye liquor.

The data processing unit 4 is provided with an input from the spectrophotometric analyser 3 and an output to each of the three metering heads 2a, 2b and 2c. An output is also provided from the data processing unit 4 to the tap 7 of the spectrophotometric analyser 3. The data processing unit has a manual setting device 10, in order to programme the unit with a predetermined concentration value, and a fully programmed record in the form of a punched card 11, determining the various functions of the data processing unit in operation of the system as will be described more fully below.

In operation of the metering system shown in the drawing, the mixing tank 1 is charged with the required volume of the dye liquor solvent or dispersion medium, and the metering heads 2a, 2b and 2c are each charged with a sufficient quantity of the dye component required in the final dye liquor. To set up the data processing unit 4, the manual setting device 10 is preset to the required concentration of each of the three dye components of the final dye liquor and the data processing unit is charged with the punched card programme record 11.

With the system set up, production of the final dye liquor is as follows. The first function of the data processing unit which is dictated by the punched card 11 is the metering out into the mixing tank 1 of 90 percent of the predetermined amount of each dye component in the final dye liquor. Thorough mixing of the resulting dye liquor is then allowed to ensue for a predetermined interval controlled by a second function of the unit 4, being a timing function thereof. A third function of the unit then actuates tap 7 to draw a small sample of dye liquor from the mixing tank through the diluting device 6 whereby the same is diluted by a fixed amount with the dye liquor solvent or dispersion medium before passing to the spectrophotometer 5. On arrival at the spectrophotometer 5, the diluted sample is scanned across the full spectrum, the extinction measured and the measured data fed into the data processing unit. After scanning by the spectrophotometer, the measured information is processed by the data processing unit in accordance with a fourth function thereof. Processing of the data comprises correcting the measured extinction co-efficients of each dye at the absorption maximum of each dye for the absorption contributions of the other two dyes to obtain the actual extinction co-efficient of each dye at the absorption maximum thereof. The corrected information is then employed to index a concentration value corresponding to the corrected extinction co-efficient, in respect of each dye. Further, on arriving at the actual concentration value of each dye in the liquor, a fifth function compares the actual concentration of each dye with the predetermined concentration and computes for each dye the deviation. The fifth function also computes the amount of each component that has to be added to the dye liquor to reduce the deviation by a factor of 90 percent and a sixth function operates each metering head to meter out the computed quantity. The series of steps described above are all governed by the abovementioned timing or second function. Thus, on the completion of a complete operational cycle i.e. after initial metering to the subsequent metering of dye components, the timing function sets the complete cycle in operation once more until a total of three complete cycles has been effected. At this stage, assuming that the impurity of the dye components is no more than about 10 percent, then a final dye liquor will be produced which is, within practical limits, of the same concentration with respect to each of the dye components as the predetermined concentration, despite up to 10 percent impurity in the dye components, and moreover, which will be produced in a completely automatic manner, having established the data processing unit programme governing the functions of the unit.

The programme governing the functions of the data processing unit may in general be produced in known manner. That part of the programme governing the abovementioned fourth function of the unit may be determined in the following manner, viz.

A series of trials are effected in respect of each dye component (alone) dissolved or dispersed in the dye liquor solvent or dispersion medium. Thus, the extinction co-efficient of each dyestuff across the spectrum is measured at a series of concentrations and the data fed into and recorded by the data processing unit as part of the programme governing the abovementioned fourth function. The data processing unit is also programmed to effect a matrix calculation on the recorded data at the absorption maximum of each dye component, i.e. to integrate the data on all three dyes over the absorption maximum of each dye, and so to correlate the measured extinction co-efficient data of each dye in the dye liquor with the actual concentration thereof in the liquor.

What is claimed is:

1. An automatic metering system for producing a liquid at least one component of which is present at a predetermined concentration which comprises a mixing tank in which the liquor components are mixed, a metering device adapted to meter out varying amounts of at least one of the components into the mixing tank, an analyser adapted to measure the concentration in the mixed liquor components of a component which is to be ultimately present at a predetermined concentration and a data processing unit with an imput from the analyser and an output to the metering device, being programmed to effect an operational cycle which comprises computing the deviation of the measured concentration from the predetermined concentration, correlating the deviation with the amount of at least one of the components necessary to be metered out substantially to reduce said deviation by a reduction factor of less than 100 percent and automatically operating the metering device to meter out the correlated amount, and to repeat said operational cycle until the predetermined concentration has been substantially reached.

2. An automatic metering system according to claim 1, wherein the data processing unit is programmed to operate the metering device before commencing the operational cycle to meter out into the mixing chamber a proportion of the amount of the liquor component which is to be present at a predetermined concentration.

3. An automatic metering system according to claim 2, wherein said proportion corresponds to the reduction factor applied in the operational cycle.

4. An automatic metering system according to claim 1, wherein said reduction factor is from 40 to 95 percent.

5. An automatic metering system according to claim 4, wherein said reduction factor is from 80 to 90 percent.

6. An automatic metering system according to claim 1, wherein the data processing unit is programmed to repeat the operational cycle thereof from 1 to 10 times.

7. An automatic metering system according to claim 6, wherein the data processing unit is programmed to repeat the operational cycle 2 or 3 times.

8. An automatic metering system according to claim 1, wherein the analyser comprises a spectrophotometer.

9. An automatic metering system according to claim 8, wherein the spectrophotometer incorporates a device enabling the spectrophotometer to operate over the optimum absorption range.

10. An automatic metering system according to claim 9, wherein said device comprises a liquor dilution device.

11. An automatic metering system according to claim 1, wherein the metering device comprises from 2 to 5 metering heads, each adapted to handle a separate liquor component.

12. An automatic metering system according to claim 11, wherein the metering device comprises 3 metering heads, each adapted to handle a separate liquor component.

13. An automatic metering system according to claim 11 wherein the analyser is adapted to measure the concentrations of a plurality of components which are to be present at predetermined concentrations, and the data processing unit is programmed to compute the deviation of the measured concentrations from the respective predetermined concentrations, correlate the deviations with the amounts of the respective components to be metered out to reduce said deviations by a reduction factor of less than 100% and automatically operate the metering devices to meter out the correlated amounts.

14. An automatic metering system according to claim 13 wherein the analyser is a spectrophotometer having a diluting device for diluting the samples of liquor to be analysed and adapted to measure the extinction coefficient of each measured component at its respective absorption maximum and the data processing unit is additionally programmed to correct the extinction coefficient data at the absorption maximum of a particular component for the absorption due to other components in the liquor at the absorption maximum of the particular component under observation and convert the corrected extinction coefficient data into data compatible with the predetermined concentration data.

15. A method of automatically producing a liquor containing a predetermined concentration of at least one component thereof which comprises effecting the operational cycle of measuring the concentration in a premixed liquor of a component which is to be ultimately present at a predetermined concentration, automatically determining the deviation of the measured concentration from the predetermined concentration, correlating the deviation with the amount of at least one of the components to be added to the liquor substantially to reduce said deviation by a reduction factor of less than 100 percent and automatically metering out the correlated amount into the premixed liquor, and repeating said operational cycle until the predetermined concentration has been substantially reached.

16. A method according to claim 15, wherein the premixed liquor is prepared before effecting the operational cycle, the component which is to be ultimately present at the predetermined concentration being automatically metered out in an amount corresponding to a proportion of the amount necessary to give said predetermined concentration.

17. A method according to claim 6, wherein the said proportion corresponds to the reduction factor applied in the operational cycle.

18. A method according to claim 15, wherein said reduction factor is from 40 to 95 percent.

19. A method according to claim 18, wherein said reduction factor is from 80 to 90 percent.

20. A method according to claim 15, wherein the operational cycle is repeated from 1 to 10 times.

21. A method according to claim 20, wherein the operational cycle is repeated 2 or 3 times.

22. A method according to claim 15, when applied to the production of a liquor having a predetermined concentration of 2 to 5 separate liquor components.

23. A method according to claim 22, when applied to the production of a liquor having a predetermined concentration of 3 separate liquor components.

24. A method according to claim 15, when applied to the production of a dye liquor.

25. A method according to claim 15 which comprises measuring, by means of a spectrophotometer, the extinction coefficients at their respective absorption maxima of each of a plurality of dyes in a dye liquor, correcting the extinction coefficient data for each dye at its absorption maximum for the absorption due to the other dyes in the liquor, converting the corrected extinction coefficients into corresponding concentration measurements for each dye, computing the deviation between the measured concentration and the predetermined concentration for each dye, correlating each deviation with the amount of each dye to be added to the liquor to reduce each deviation by a factor of 50 to 95 percent, metering out the correlated amount of each dye into the liquor and repeating the foregoing until the predetermined concentration of each dye has been substantially reached.

* * * * *